(12) United States Patent
Collins

(10) Patent No.: US 6,535,349 B1
(45) Date of Patent: Mar. 18, 2003

(54) TAPE TRANSFER WITH LATERALLY MOVING HEAD

(75) Inventor: Gary W. Collins, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/452,704

(22) Filed: Dec. 2, 1999

(51) Int. Cl.[7] ................................................. G11B 5/48
(52) U.S. Cl. ..................................................... 360/96.3
(58) Field of Search .............................. 360/81, 82, 83, 360/84, 85, 93, 94, 251, 251.1, 251.2, 251.3, 251.4, 251.5, 260, 96.3, 130.21, 132, 137, 128; 242/347, 345; 346/33 MC

(56) References Cited

U.S. PATENT DOCUMENTS

| 3,207,517 A | | 9/1965 | Tanigawa et al. |
| 3,265,317 A | | 8/1966 | Liang et al. |
| 3,727,198 A | * | 4/1973 | Lowenson ............. 346/33 MC |
| 3,833,185 A | | 9/1974 | Talavera |
| 3,862,729 A | | 1/1975 | Staar |
| 3,870,248 A | | 3/1975 | Nara et al. |
| 3,930,268 A | | 12/1975 | Uemura |
| 4,235,395 A | | 11/1980 | Wardenaar et al. |
| 4,263,628 A | * | 4/1981 | Timm ........................ 360/96.3 |
| 4,337,909 A | | 7/1982 | Harja |
| 4,541,024 A | | 9/1985 | Sieben |
| 4,723,236 A | * | 2/1988 | Kitami ........................ 360/93 |
| 4,821,102 A | * | 4/1989 | Ichikawa et al. ........... 348/511 |
| 5,114,913 A | | 5/1992 | Coufal et al. |
| 5,173,820 A | | 12/1992 | Yoneda |
| 5,239,432 A | | 8/1993 | Kuroda |
| 5,294,072 A | * | 3/1994 | East et al. ................... 242/199 |
| 5,626,305 A | * | 5/1997 | Hashizumi et al. ......... 242/347 |
| 5,627,706 A | * | 5/1997 | Ishkawa ..................... 360/132 |
| 5,638,238 A | * | 6/1997 | Kubota et al. ......... 360/130.21 |
| 6,104,580 A | * | 8/2000 | Yoshiya et al. ............. 360/128 |
| 6,137,655 A | * | 10/2000 | Hoko et al. ................. 360/137 |

* cited by examiner

Primary Examiner—Hoa T. Nguyen
Assistant Examiner—Tianjie Chen
(74) Attorney, Agent, or Firm—Brooks & Kushman P.C.

(57) ABSTRACT

A tape transport system includes two hubs within an enclosure having smooth interior surfaces. A tape head is positioned between the tape hubs so that the magnetic tape travels between the tape hubs and over a tape head contact surface. The tape head moves laterally in a direction parallel to the direction of tape travel based on the amount of magnetic tape held on at least one of the hubs.

17 Claims, 1 Drawing Sheet

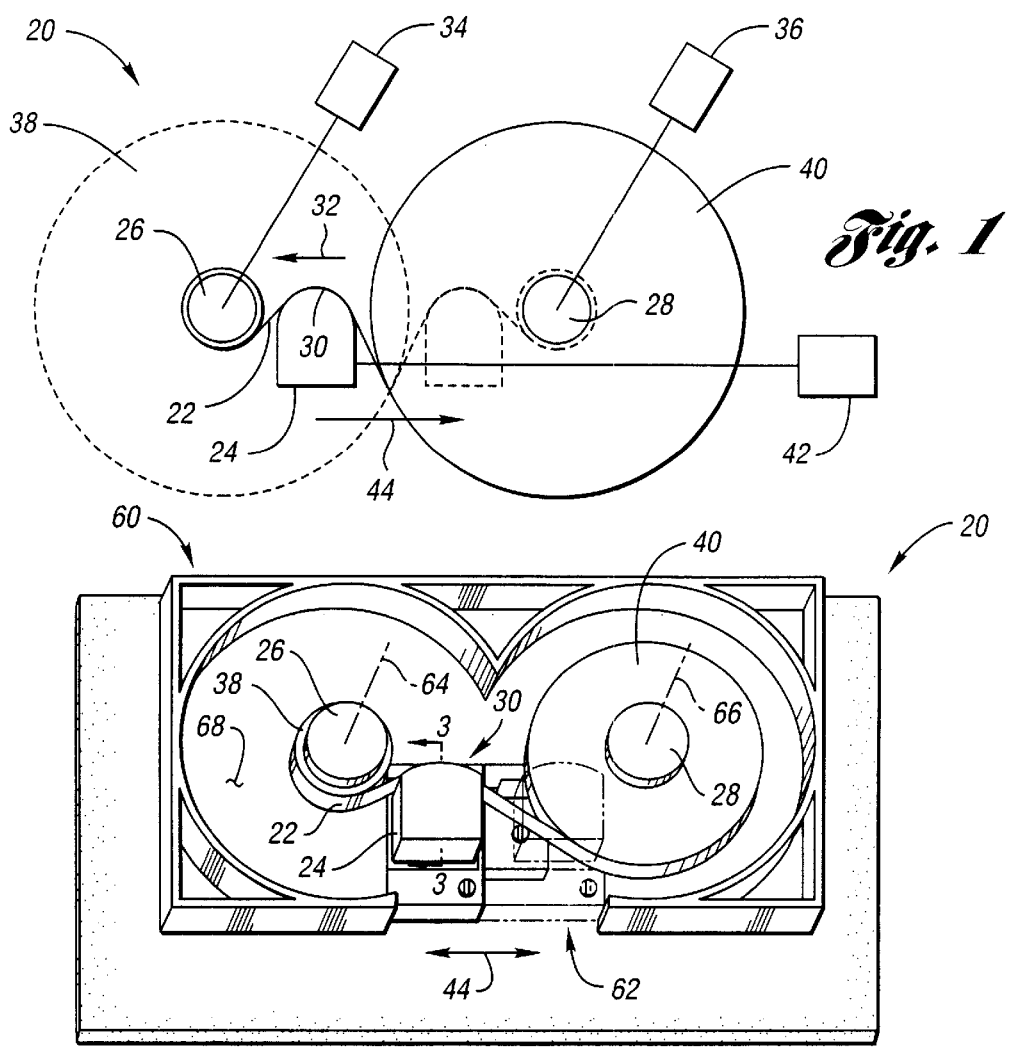
Fig. 1
Fig. 2
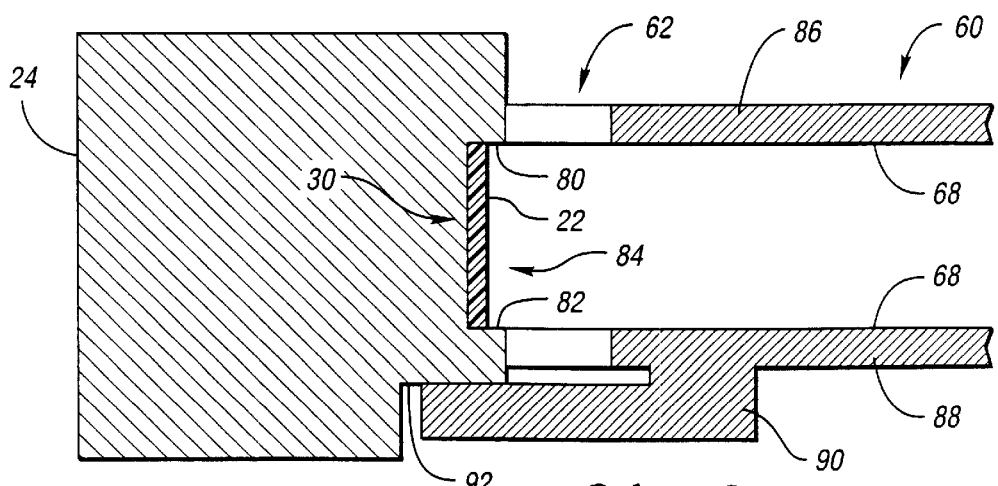
Fig. 3

TAPE TRANSFER WITH LATERALLY MOVING HEAD

TECHNICAL FIELD

The present invention relates to guiding magnetic tape from hubs across a tape access head.

BACKGROUND ART

Magnetic tape is commonly used to store voice and data information due to its reliability, cost efficiency, and ease of use. Magnetic tape may be made more useful and cost effective by increasing the density of information stored on the magnetic tape. One method of increasing information density is to decrease the thickness of the tape thereby permitting more tape to be stored in a given volume.

Decreasing the thickness of magnetic tape creates difficulties in a tape transport system. Thinner tape more easily stretches, increasing the possibility of read and write errors. Thin tape is also susceptible to folding, kinking, creasing, curling and other mechanical damage. Thin tape is more easily skewed relative to the tape head. These difficulties are exacerbated by complex tape transport systems requiring rollers, guides, pins, and the like to drive the tape and position the tape relative to the tape head.

What is needed is an effective tape transport system for thin tape. The tape transport system must be able to guide the magnetic tape past the tape head without causing mechanical damage. The tape transport system should further be simple, inexpensive, and easy to maintain.

DISCLOSURE OF INVENTION

It is an object of the present invention to guide thin magnetic tape past a tape head.

It is another object of the present invention to increase the volume density of information stored on magnetic tape.

It is still another object of the present invention to decrease the size of a tape system required to access a given volume of magnetic tape.

It is yet another object of the present invention to position magnetic tape relative to the tape head.

It is a further object of the present invention to protect magnetic tape from mechanical damage along the tape path.

It is a still further object of the present invention to reduce the complexity of the tape path.

In carrying out the above objects and other objects and features of the present invention, a tape transport system is provided. An enclosure with smooth interior surfaces contains two hubs for holding the magnetic tape. A tape head is positioned between the tape hubs so that the magnetic tape travels between the tape hubs and over a tape head contact surface. The tape head moves laterally in a direction parallel to the tape direction based on the amount of magnetic tape held on at least one of the hubs.

In an embodiment of the present invention, the tape head has two flanges on the contact surface for aligning the magnetic tape with the tape head. The flanges form a channel having a width substantially the same as the magnetic tape width, thereby positioning the tape transversely across the tape head.

In another embodiment of the present invention, the enclosure has an opening in a side between the first hub and the second hub. The enclosure has a registration feature extending into the opening. The tape head has a head registration surface for accepting the head registration feature, thereby positioning the enclosure relative to the tape head.

A method of guiding magnetic tape past the tape head is also provided. Magnetic tape extending between the hubs is contacted with the tape head. The tape is driven in a tape direction from the first hub, over a contact surface on the tape head, and onto the second hub. The tape head is positioned in a lateral direction between the hubs based on the amount of tape held on at least one of the hubs.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a schematic drawing of a tape transport system with a laterally moving tape head located between two flangeless tape hubs according to an embodiment of the present invention;

FIG. 2 is a detailed drawing of a tape transport system according to an embodiment of the present invention; and FIG. 3 is a cross sectional drawing of a tape head and enclosure according to an embodiment of the present invention.

BEST MODE FOR CARRYING OUT THE INVENTION

Referring to FIG. 1, a schematic drawing of a tape transport system with a laterally moving tape head located between two flangeless tape hubs according to an embodiment of the present invention is shown. A tape transport system, shown generally by 20, moves magnetic tape 22 past tape head 24. Tape 22 travels between two hubs 26, 28, around each of which tape 22 is wound. Hubs 26, 28 may be contained within a tape cassette. Alternatively, one or both of hubs 26, 28 may be held within a tape cartridge. As will be recognized by one of ordinary skill in the art, the present invention will operate with a variety of means for holding tape 22.

In tape transport system 20, tape 22 leaves first hub 28, passes over curved contact surface 30 on tape head 24 in tape direction 32, and is then wound around second hub 26. Typically, tape 22 is driven by tension from receiving hub 26. Receiving hub 26 may be driven by tape drive 34, such as an electric motor. For rewind or tape access in the opposite tape direction, hub 28 is driven by tape drive 36. Tape drives 34, 36 may operate from the same or different drive forces. Also, tape drives 34, 36 may operate concurrently to reduce the tension on tape 22. Various mechanisms that may be used for tape drives 34, 36 are well known in the art of tape transport systems.

To save space, hubs 26, 28 are located closely together. In the embodiment shown in FIG. 1, the space required for fully wound tape pack 38 on hub 26 overlaps the space required for fully wound tape pack 40 on hub 28. Head drive 42 moves tape head 24 laterally in head direction 44 parallel to tape direction 32 between hubs 26, 28 based on the amount of tape 22 held on at least one of hubs 26, 28. As tape is transferred from hub 28 to hub 26, tape head 24 is gradually moved away from hub 26 and towards hub 28. Laterally moving tape head 24 makes sufficient room for the changing sizes of tape packs 38, 40. Laterally moving tape head 24 also assures that tape 22 properly wraps over contact surface 30. Tape transport system 20 eliminates the need for a complex tape path including rollers, guides, pins, and the like, which may stretch or otherwise damage tape 22. Hence, tape transport system 20 presents an alternative to traditional tape transport systems for thin magnetic tape 22.

Head drive 42 may be implemented using a variety of means. Head drive 42 may include, for example, an electric motor driving a lead screw. A threaded nut attached to tape head 24 converts lead screw rotation into translation in head direction 44. Alternatively, a stepper or servo motor may be connected through a gear train to a linear rack attached to tape head 24. Head drive 42 may also be implemented using an electric, pneumatic, or hydraulic linear motor.

Head 24 is positioned between hubs 26, 28 based on the amount of tape 22 wound on at least one of hubs 26,28. This amount of tape 22 may be determined in a variety of manners. For example, tape 22 typically includes markings which may be read by tape head 24 to indicate the position of head 24 along the length of tape 22. Also, one or both of tape drives 34, 36 may include a rotational counter. If hub 26, 28 is first completely wound or unwound, the rotational counter gives an indication of the amount of tape 22 that has past tape head 24. Alternatively, devices for directly measuring the size of one or both of tape pack 38, 40, such as optical sensors, mechanical sensor, or the like, may be placed in proximity to hubs 26, 28.

Referring now to FIG. 2, a detailed drawing of a tape transport system according to an embodiment of the present invention is shown. Hubs 26, 28 are contained in an enclosure, shown generally by 60. The cover of enclosure 60 is not shown for clarity. Opening 62 in enclosure 60 permits tape head 24 to contact magnetic tape 22. During operation, hubs 26, 28 are captured within enclosure 60 to rotate about hub axes 64, 66 respectively. Smooth surfaces normal to hub axes 64, 66, one of which is indicated by 68, guide tape wrapped in tape packs 38, 40. Hence, hubs 26, 28 are flangeless.

Referring now to FIG. 3, a cross sectional drawing of a tape head and enclosure according to an embodiment of the present invention is shown. Tape head 24 includes top flange 80 and bottom flange 82 forming channel 84 through which tape 22 travels over contact surface 30. The width of channel 84 is substantially the same as the width of tape 22. Channel 84 therefore properly aligns tape 22 with tape head 24.

Enclosure 60 includes top cover 86 and bottom cover 88. The inside surfaces of top cover 86 and bottom cover 88 are smooth surfaces 68 for guiding tape onto hubs 26, 28. In a preferred embodiment, tape transport system 20 positions enclosure 60 vertically, so that gravity does not bias tape 22 against either top cover 86 or bottom cover 88. Bottom cover 88 includes registration feature 90 extending into opening 62 in enclosure 60. Registration feature 90 seats on registration surface 92 in tape head 24, positioning enclosure 60 relative to tape head 24.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A tape transport system for positioning magnetic tape moving in a tape direction, the system comprising:
    an elongated enclosure with smooth interior surfaces on elongated sides;
    a first hub for holding magnetic tape disposed within the enclosure, the first hub having an axis of rotation perpendicular to the elongated sides and rotating in a first direction;
    a second hub for holding magnetic tape disposed within the enclosure, the second hub having an axis of rotation parallel to the first hub axis of rotation and rotating in the first direction, the magnetic tape operative to travel between the first hub and the second hub in the tape direction;
    a tape head for accessing the magnetic tape, the tape head having a curved tape contact surface; and
    a head drive positioning the tape head between the first hub and the second hub such that magnetic tape extends from each hub and contacts the contact surface;
    whereby the head drive moves the tape head laterally in a direction substantially parallel to the tape direction between the first hub and the second hub, the tape head positioned laterally between the first hub and the second hub based on the amount of magnetic tape held on at least one of the first hub and the second hub.

2. A tape transport system as in claim 1 wherein the tape head further comprises two flanges on the contact surface for aligning the magnetic tape relative to the tape head, the two flanges forming a channel having a width substantially the sane as the magnetic tape width.

3. A tape transport system as in claim 1 wherein the enclosure comprises an opening in a side of the enclosure, the opening located between the first hub and the second hub.

4. A tape transport system as in claim 3 wherein the enclosure comprises a registration feature extending from a side of the enclosure perpendicular to the first hub axis of rotation, the registration feature extending into the opening and wherein the tape head further comprises a head registration surface for accepting the registration feature, thereby positioning the enclosure relative to the tape head.

5. A method of guiding magnetic tape passing a tape head comprising:
    contacting the magnetic tape with the tape head, the magnetic tape extending between a first hub and a second hub;
    driving the tape in a tape direction from the first hub, over a contact surface on the tape head, and onto the second hub; and
    moving the tape head laterally between the first hub and the second hub based on the amount of tape held on at least one of the first hub and the second hub, the tape head movable along a straight line extending between the first hub and the second hub.

6. A method of guiding magnetic tape passing a tape head as in claim 5 wherein the first hub and the second hub are flangeless, the method further comprising positioning tape wound on the first hub and the second hub using the inner surfaces of an enclosure containing the first hub and the second hub.

7. A method of guiding magnetic tape passing a tape head as in claim 5 further comprising locating the magnetic tape in a direction normal to the tape direction by passing the magnetic tape between two flanges on the tape head.

8. A method of guiding magnetic tape passing a tape head as in claim 5 wherein contacting the magnetic tape with the tape head comprises locating an enclosure containing the first hub and the second hub relative to the tape head by contacting a registration feature on the enclosure with a registration surface on the tape head.

9. A tape transport system for positioning magnetic tape comprising:

a first hub around which magnetic tape is wound;

a second hub around which magnetic tape is wound, the magnetic tape extending between the first hub and the second hub;

a tape head having a head surface for accessing the magnetic tape;

means for driving the tape in a tape direction from the first hub, over the head surface, and onto the second hub; and means for moving the tape head laterally along a straight line between the first hub and the second hub based on the amount of tape held on at least one of the first hub and the second hub.

10. A tape transport system for positioning magnetic tape as in claim 9 further comprising an enclosure containing the first hub and the second hub, the enclosure defining an opening into which the tape head is inserted.

11. A tape transport system for positioning magnetic tape as in claim 10 further comprising means within the enclosure for guiding tape wound on the first hub and the second hub.

12. A tape transport system for positioning magnetic tape as in claim 10 further comprising means for locating the enclosure relative to the tape head.

13. A tape transport system for positioning magnetic tape as in claim 9 further comprising means for locating the magnetic tape on the tape head contact surface.

14. A tape transport system for positioning magnetic tape moving in a tape direction, the system comprising:

a first hub for holding magnetic tape;

a second hub for holding magnetic tape;

a tape head for accessing the magnetic tape as the tape extends between the first hub and the second hub the tape head laterally movable based on the amount of magnetic tape on the hubs; and a head drive positioning the tape head along a straight line extending between the first hub and the second hub.

15. A method of guiding magnetic tape past a tape head comprising:

contacting the magnetic tape with the tape head as the magnetic tape extends between a first hub and a second hub;

driving the tape in a tape direction from the first hub, over a contact surface on the tape head, and onto the second hub; and moving the tape head along a straight line extending between the first hub and the second hub based on the amount of tape on the hubs.

16. A method of accessing magnetic tape comprising positioning a tape head along a straight line extending from a first hub to a second hub, based on the amount of tape wound on at least one of the first hub and the second hub, such that the magnetic tape extends from the first hub, past the tape head and onto the second hub wherein both hubs rotate in the same direction.

17. A method of accessing magnetic tape comprising positioning a tape head along a line extending from a first hub to a second hub, based on the amount of tape wound on at least one of the first hub and the second hub, such that the magnetic tape extends from the first hub, past the tape head and onto the second hub without touching any other tape drive components wherein both hubs rotate in the same direction.

* * * * *